(12) United States Patent
Mizuguchi (10) Patent No.: US 8,610,728 B2
(45) Date of Patent: Dec. 17, 2013

(54) RENDERING DEVICE, NON-TRANSITORY COMPUTER READABLE MEDIUM, AND IMAGE OUTPUT APPARATUS

(75) Inventor: Takuya Mizuguchi, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 13/474,421

(22) Filed: May 17, 2012

(65) Prior Publication Data

US 2013/0069959 A1 Mar. 21, 2013

(30) Foreign Application Priority Data

Sep. 21, 2011 (JP) ................. 2011-205870

(51) Int. Cl.
*G06F 15/16* (2006.01)
*G06F 17/00* (2006.01)
*H04N 7/12* (2006.01)

(52) U.S. Cl.
USPC ............ 345/502; 375/240.25; 715/202

(58) Field of Classification Search
None
See application file for complete search history.

(56) References Cited

U.S. PATENT DOCUMENTS

2008/0307296 A1* 12/2008 Maglanque ............... 715/202
2011/0194617 A1* 8/2011 Kumar et al. ........... 375/240.25

FOREIGN PATENT DOCUMENTS

JP 2000-172725 A 6/2000
JP 2000-335022 A 12/2000

OTHER PUBLICATIONS

Australian Office Action issued May 29, 2013 in a corresponding Australian Patent Application 2012203638.

* cited by examiner

*Primary Examiner* — Xiao M. Wu
*Assistant Examiner* — Matthew D Salvucci
(74) *Attorney, Agent, or Firm* — Sughrue Mion, PLLC (57) ABSTRACT

A rendering device includes a temporary memory, plural rendering processors, and a rendering controller. The temporary memory stores one or more rendering instructions and rendered results therefor in association with each other. The plural rendering processors each perform rendering processing in accordance with a rendering instruction, store the one or more rendering instructions and rendered results in association with each other in the temporary memory, when one or more similar rendering instructions exist for pages for which rendering processing was consecutively performed, and read and use the rendered results, in a case where rendered results associated with one or more rendering instructions are stored in the temporary memory. The rendering controller controls assigning a given rendering instruction to a corresponding one of the rendering processors in accordance with a given page editing instruction and causing the corresponding one of the rendering processors to perform rendering processing.

9 Claims, 9 Drawing Sheets

RENDERING DEVICE, NON-TRANSITORY COMPUTER READABLE MEDIUM, AND IMAGE OUTPUT APPARATUS

CROSS-REFERENCE TO RELATED APPLICATIONS

This application is based on and claims priority under 35 USC 119 from Japanese Patent Application No. 2011-205870 filed Sep. 21, 2011.

BACKGROUND (i) Technical Field

The present invention relates to a rendering device, a non-transitory computer readable medium, and an image output apparatus.

(ii) Related Art

In general, rendering processing is performed in accordance with rendering instructions, and images are generated. In recent years, high-speed rendering processing has been achieved by providing plural units (rendering processors) that perform such rendering processing, compared to the case where a single rendering processor is provided. In a configuration including such plural rendering processors, for example, rendering processing is assigned to individual rendering processors in units of pages, and rendering processing for the next page is assigned to a rendering processor that has terminated processing assigned thereto.

In the case where images of plural pages are to be rendered, similar rendering instructions may be given. In such a case, a so-called "caching technique" is employed. In the caching technique, a series of rendering instructions and the results of rendering processing performed in accordance with the series of rendering instructions are stored in association with each other, and when a series of similar rendering instructions are received, corresponding rendered results are read and used. With the caching technique, processing time is shortened compared to the case where rendering processing is always performed in accordance with rendering instructions.

The caching technique may be employed for the case where plural rendering processors are provided. In this case, temporary memories are provided so as to correspond to individual rendering processors, and the rendering processors independently perform caching control. Thus, when rendering instructions are given in a regular page order and rendering processing for pages including similar rendering instructions is assigned to a single rendering processor, registration to a corresponding temporary memory is made and the corresponding temporary memory is used. However, if allocation of pages to individual rendering processors is not performed successfully, not only are rendered results stored in temporary memories not used, but registration to the temporary memories is also not performed.

For example, the case where two rendering processors, that is, a first rendering processor and a second rendering processor, are provided and images of plural pages in which odd number pages are similar to each other and even number pages are similar to each other are to be rendered will be explained. In this case, the first rendering processor performs rendering for the first page, and the second rendering processor performs rendering for the second page. If rendering for the first page is completed earlier than rendering for the second page, the first rendering processor performs rendering for the third page, which is similar to the first page. One or more similar rendering instructions and rendered results for the one or more similar rendering instructions are stored in a temporary memory, and the rendered results are used for processing for later pages. However, when the first rendering processor performs rendering for the first page and the second rendering processor performs rendering for the second page, rendering for the second page may be completed earlier than rendering for the first page. In this case, the second rendering processor performs rendering for the third page and the first rendering processor performs rendering for the fourth page. Since each of the first and second rendering processors does not perform processing for pages similar to each other, rendered results are not stored in temporary memories. Thus, rendered results are not used for later processing.

SUMMARY

According to an aspect of the invention, there is provided a rendering device including a temporary memory, plural rendering processors, and a rendering controller. The temporary memory stores one or more rendering instructions and rendered results for the one or more rendering instructions in association with each other. The plural rendering processors each perform rendering processing in accordance with a rendering instruction, store the one or more rendering instructions and rendered results in association with each other in the temporary memory, in a case where one or more similar rendering instructions exist for pages for which rendering processing was consecutively performed, and read and use the rendered results associated with the one or more rendering instructions, in a case where rendered results associated with one or more rendering instructions for rendering are stored in the temporary memory. The rendering controller controls assigning a given rendering instruction to a corresponding one of the rendering processors in accordance with a given page editing instruction and causing the corresponding one of the rendering processors to perform rendering processing.

BRIEF DESCRIPTION OF THE DRAWINGS

Exemplary embodiments of the present invention will be described in detail based on the following figures, wherein.

DETAILED DESCRIPTION

Figure 1:
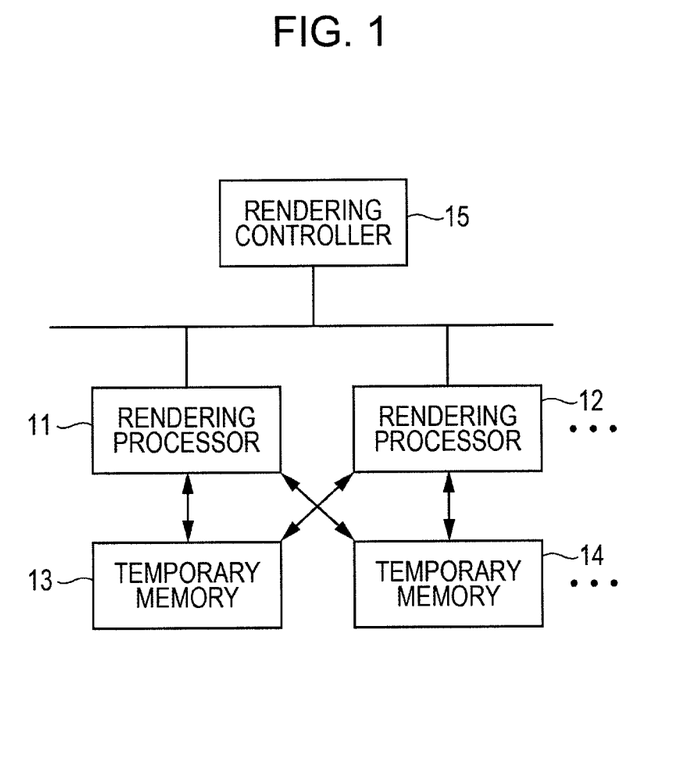
FIG. 1 is a diagram illustrating the configuration of a rendering device according to an exemplary embodiment of the invention.

FIG. 1 is a diagram illustrating the configuration of a rendering device according to an exemplary embodiment of the invention. Referring to FIG. 1, the rendering device includes rendering processors 11 and 12, temporary memories 13 and 14, and a rendering controller 15. A series of rendering instructions for rendering images of one or more pages are given. Various page editing instructions, such as an instruction for double-sided output, an instruction for N-up output, and an instruction for booklet output, may be added to given rendering instructions.

The example illustrated in FIG. 1 illustrates the case where two rendering processors, that is, the rendering processor 11 and the rendering processor 12, are provided. However, the number of rendering processors is not limited. Three or more rendering processors may be provided.

Each of the rendering processors 11 and 12 performs, under the control of the rendering controller 15, rendering processing in accordance with an assigned rendering instruction for a page. In the case where one or more similar rendering instructions exist for pages for which rendering processing was consecutively performed, the one or more rendering instructions and rendered results for the one or more rendering instructions are stored in association with each other in a temporary memory (in this case, the temporary memory 13 for the rendering processor 11, and the temporary memory 14 for the rendering processor 12). Furthermore, in the case where one or more rendering instructions and rendered results for the one or more rendering instructions are stored in association with each other in a temporary memory (the temporary memory 13 or 14) and a received rendering instruction contains the stored one or more rendering instructions, the rendered results associated with the one or more rendering instructions are read and used as rendered results for the one or more rendering instructions in the received rendering instruction.

In the example illustrated in FIG. 1, the temporary memory 13 and the temporary memory 14 are provided for the rendering processor 11 and the rendering processor 12, respectively. The temporary memories 13 and 14 each store one or more rendering instructions and rendered results for the one or more rendering instructions in association with each other. In the case where there is no space to store another one or more rendering instructions and rendered results, one or more rendering instructions and rendered results may be deleted using a known method in which deletion is made in the order from the oldest one or in ascending order of use frequency and new one or more rendering instructions and rendered results may be stored. Although temporary memories are provided so as to correspond to individual rendering processors in this example, a temporary memory may be shared among plural rendering processors.

The rendering controller 15 assigns given rendering instructions to the rendering processor 11 and the rendering processor 12 in units of pages and causes the rendering processor 11 and the rendering processor 12 to perform rendering processing. For assigning of rendering instructions to the rendering processors 11 and 12, basically, a rendering instruction for the next page may be assigned to a rendering processor that has terminated rendering processing assigned thereto or assigning of rendering instructions for individual pages may be performed while the progress of rendering processing in rendering processors is estimated using a known method. However, when a page editing instruction has been issued, assigning of rendering instructions for individual pages is performed in accordance with the page editing instruction.

Figure 2A:
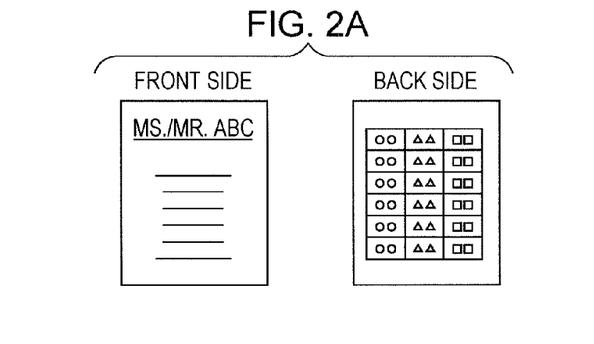
FIGS. 2A and 2B explain an example of assigning of rendering instructions in the case where an instruction for double-sided output has been issued as a page editing instruction.
Figure 2B:
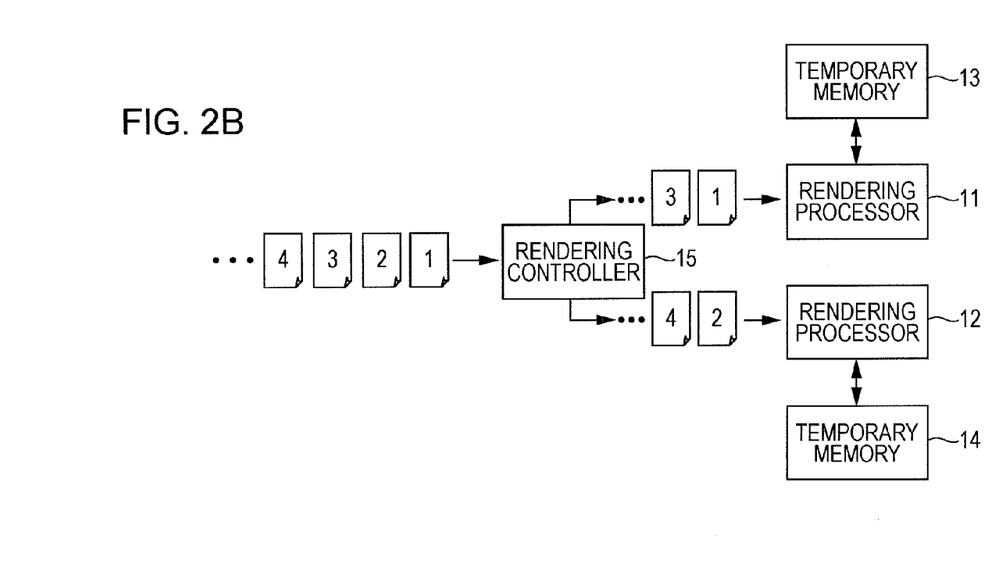

Rendering instruction assigning processing for some page editing instructions will now be explained. FIGS. 2A and 2B explain an example of assigning of rendering instructions in the case where an instruction for double-sided output has been issued as a page editing instruction. In the case where an instruction for double-sided output has been issued as a page editing instruction, the document format on the front side may be made different from the document format on the back side. For example, in various documents, such as leaflets, bills, and health certificates, an addressee and general information may be written on the front side and detailed information may be written on the back side. In such a case, different types of information may be written in the same document format on the front side, and different types of information may be written in the same document format on the back side. In the example illustrated in FIG. 2A, on the front side, an addressee "Dear Ms./Mr. ABC" is provided and information is written. On the back side, information is written in a tabular format. It is assumed that although an addressee and information to be written may be changed, the same document format is used on the front side and the same document format is used on the back side.

Based on this assumption, in the case where an instruction for double-sided output has been issued as a page editing instruction, rendering instructions for odd number pages may be assigned to one rendering processor (in this case, the rendering processor 11) and rendering instructions for even number pages may be assigned to another rendering processor (in this case, the rendering processor 12), as illustrated in FIG. 2B. In FIG. 2B, an example in which rendering instructions for individual pages are numbered using sequential numbers is illustrated. In this example, rendering instructions for odd number pages, such as the first page, the third page, and so on, are assigned to the rendering processor 11 and rendering instructions for even number pages, such as the second page, the fourth page, and so on, are assigned to the rendering processor 12.

As described above, by assigning rendering instructions for individual pages to corresponding rendering processors, for example, rendering instructions for odd number pages assigned to the rendering processor 11 are applied to rendering of images in the same document format. Thus, compared to the case where rendering instructions for an odd number page and an even number page are assigned to a rendering processor, the probability of one or more similar rendering instructions existing for pages for which rendering processing is consecutively performed is high. One or more rendering instructions existing for pages for which rendering processing is consecutively performed are stored, together with rendered results for the rendering instructions, into the temporary memory 13. Then, for rendering processing based on rendering instructions for the subsequent odd number page, the rendered results may be read and used. When rendered results stored in the temporary memory 13 are used, there is no need to perform rendering processing in accordance with corresponding one or more rendering instructions, thus the processing time being reduced compared to the case where rendering processing is performed in accordance with a corresponding rendering instruction. For example, for rendering instructions for even number pages assigned to the rendering processor 12, the probability of one or more similar rendering instructions existing for pages for which rendering processing is consecutively performed is high compared to the case where rendering instructions for an odd number page and an even number page are assigned to a rendering processor. Furthermore, the probability of rendered results being stored in the temporary memory 13 and being used also increases.

For example, in the case where a rendering instruction for an odd number page and then a rendering instruction for an even number page are assigned to the rendering processor 11 or in the case where a rendering instruction for an even number page and then a rendering instruction for an odd number page are assigned to the rendering processor 12, document formats for pages for which rendering processing is consecutively performed differ from each other. Thus, one or more rendering instructions and rendered results are not registered to the temporary memory 13 or the temporary memory 14. Therefore, rendered results are not used for a rendering instruction for the subsequent page. By consecutively assigning rendering instructions for odd number pages to one rendering processor and consecutively assigning rendering instructions for even number pages to another rendering processor, the rendering processors each handle the corresponding same document format. Thus, one or more rendering instructions and rendered results for the one or more rendering instructions are registered in temporary memories, and rendered results stored in the temporary memories are used for rendering processing.

Figure 3:
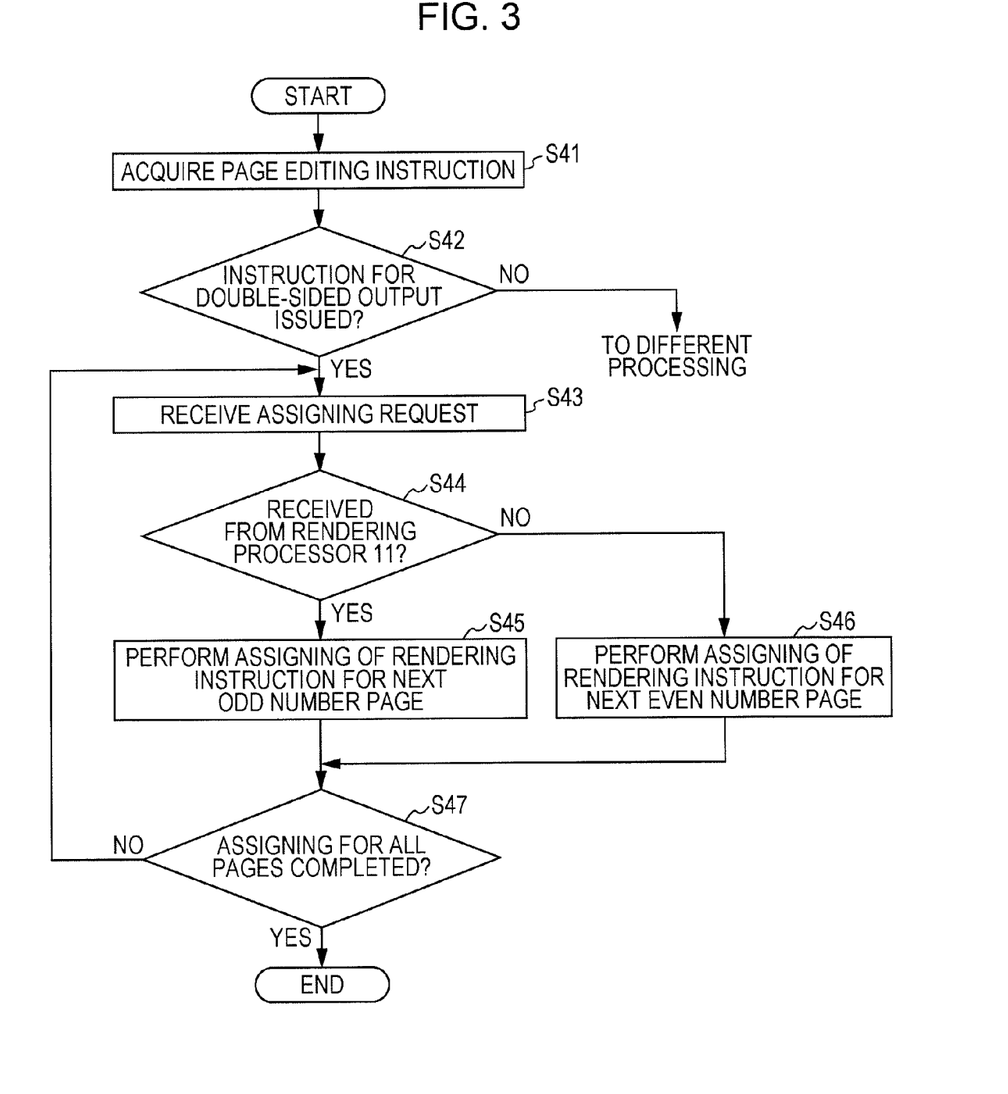
FIG. 3 is a flowchart illustrating an example of a rendering instruction assigning process performed in the case where an instruction for double-sided output has been issued as a page editing instruction.

FIG. 3 is a flowchart illustrating an example of a rendering instruction assigning process performed in the case where an instruction for double-sided output has been issued as a page editing instruction. In step S41, a page editing instruction is acquired. In step S42, it is determined whether or not the page editing instruction acquired in step S41 is an instruction for double-sided output. When no page editing instruction is acquired or the acquired page editing instruction is not an instruction for double-sided output, existing assigning processing or assigning processing corresponding to the acquired page editing instruction that is different from an instruction for double-sided output is performed.

When the acquired page editing instruction is an instruction for double-sided output, a rendering instruction assigning request is received from the rendering processor 11 or the rendering processor 12 in step S43. In step S44, it is determined whether or not the rendering instruction assigning request has been received from the rendering processor 11. In this example, the rendering processor 11 performs rendering processing for odd number pages, and the rendering processor 12 performs rendering processing for even number pages. When the rendering instruction assigning request has been received from the rendering processor 11, a rendering instruction for the next odd number page is assigned to the rendering processor 11 in step S45. When the rendering processing assigning request has been received from the rendering processor 12, a rendering instruction for the next even number page is assigned to the rendering processor 12 in step S46.

In step S47, it is determined whether or not assigning of all the given rendering instructions is completed. When assigning of all the given rendering instructions is not completed, the process returns to step S43 to wait for an assigning request from the rendering processor 11 or the rendering processor 12. When assigning of all the given rendering instructions is completed, assigning processing for the given rendering instructions is terminated.

By performing the assigning process described above, rendering instructions for odd number pages are consecutively assigned to the rendering processor 11 and rendering instructions for even number pages are consecutively assigned to the rendering processor 12. For example, in the case where the same document format is used for a page on the front side, the same document format is used for a page on the back side, and the document format for the page on the front side is different from the document format for the page on the back side, as illustrated in FIG. 2A, one or more rendering instructions corresponding to the document format for a page on the front side, which is an odd number page, and rendered results for the one or more rendering instructions are stored in the temporary memory 13 and are used for rendering processing for the subsequent odd number page. In addition, one or more rendering instructions corresponding to the document format for a page on the back side, which is an even number page, and rendered results for the one or more rendering instructions are stored in the temporary memory 14 and are used for rendering processing for the subsequent even number page.

Figure 4A:
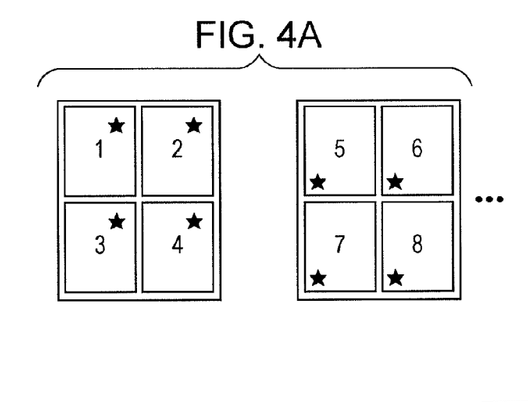
FIGS. 4A and 4B explain an example of assigning of rendering instructions in the case where an instruction for N-up output has been issued as a page editing instruction.
Figure 4B:
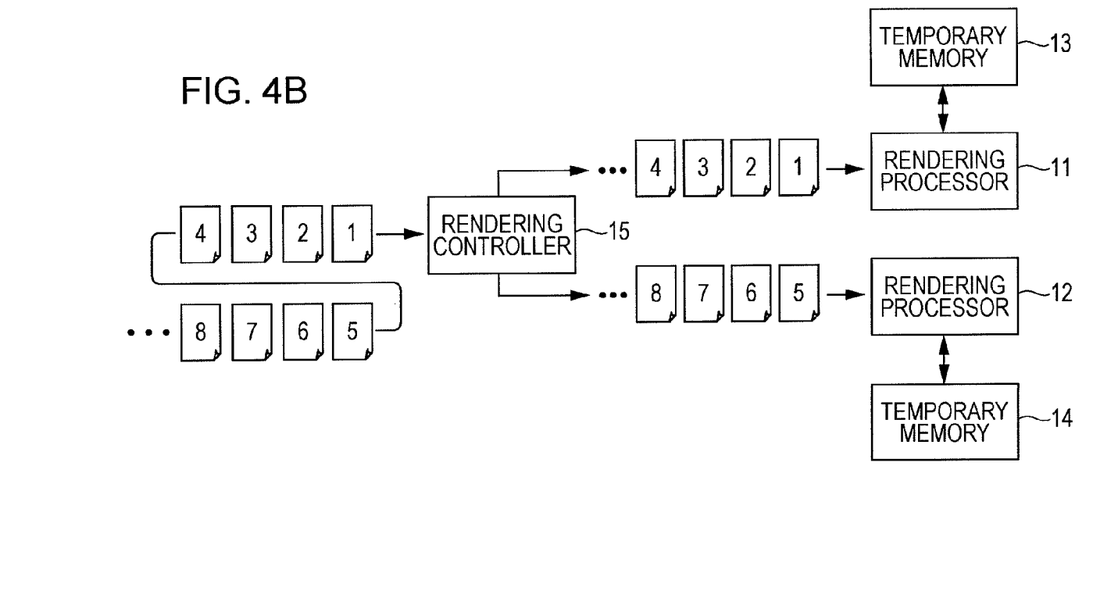

FIGS. 4A and 4B explain an example of assigning of rendering instructions in the case where an instruction for N-up output has been issued as a page editing instruction. An instruction for N-up output, which is a page editing instruction, is an instruction for outputting images of N pages as a single image. In general, an instruction for N-up output is issued when the number of output pages is reduced compared to the case where pages are output individually, that is, the number of output pages is reduced to 1/N. In the case where an instruction for N-up output is issued, a sufficient number of pages are to be output and similar document formats are expected to be used for consecutive pages.

In FIG. 4A, numbers represent page numbers, and the case where an instruction for 4-up output has been issued is illustrated. Positions of star marks represent differences in document format. The first, second, third, and fourth pages are in similar document formats, and the fifth, sixth, seventh, and eighth pages are in similar document formats.

From the above-mentioned view point, in the case where an instruction for N-up output has been issued as a page editing instruction, rendering instructions for N pages are assigned as a unit to a corresponding rendering processor. That is, rendering instructions for consecutive N pages that are to be output to one sheet are assigned to a single rendering processor. For example, in the example illustrated in FIG. 4B, rendering instructions for individual pages are represented using sequential numbers. In the case where an instruction for 4-up output has been issued, rendering instructions for the consecutive first, second, third, and fourth pages that are to be output to one sheet are assigned to the rendering processor 11, and rendering instructions for the consecutive fifth, sixth, seventh, and eighth pages that are to be output to one sheet are assigned to the rendering processor 12.

As described above, by assigning rendering instructions for consecutive N pages that are to be output to one sheet as a unit to a corresponding rendering processor, rendering instructions for the first, second, third, and fourth pages that are assigned, for example, to the rendering processor 11 are applied to rendering of images in similar document formats. In this case, when one or more rendering instructions similar to that for the first page exists for rendering processing for the second page, the one or more rendering instructions and rendered results for the one or more rendering instructions are stored into the temporary memory 13 and are used for rendering processing for the third and fourth pages. Rendering instructions for the fifth, sixth, seventh, and eighth pages that are assigned, for example, to the rendering processor 12 are applied to rendering of images in similar document formats. In this case, when one or more rendering instructions similar to that for the fifth page exists for rendering processing for the sixth page, the one or more rendering instructions and rendered results for the one or more rendering instructions are stored into the temporary memory 14 and are used for rendering processing for the seventh and eighth pages.

For example, when rendering instructions are assigned to the rendering processor 11 and the rendering processor 12 in the order of pages, the rendering processor 11 performs rendering processing for the first, third, fifth, and seventh pages and the rendering processor 12 performs rendering processing for the second, fourth, sixth, and eighth pages. In this case, when one or more rendering instructions similar to that for the first page exists for rendering processing for the third page, the rendering processor 11 stores the one or more rendering instructions and rendered results for the one or more rendering instructions into the temporary memory 13. However, the rendered results are not used for rendering processing for the fifth page and the subsequent pages. In addition, when one or more rendering instructions similar to that for the second page exist for rendering processing for the fourth page, the rendering processor 12 stores the one or more rendering instructions and rendered results for the one or more rendering instructions into the temporary memory 14. However, the rendered results are not used for rendering processing for the sixth page and the subsequent pages. Accordingly, by assigning rendering instructions for consecutive N pages that are to be output to one sheet as a unit to a corresponding rendering processor, registration to a temporary memory and rendered results stored in the temporary memory are used.

Figure 5:
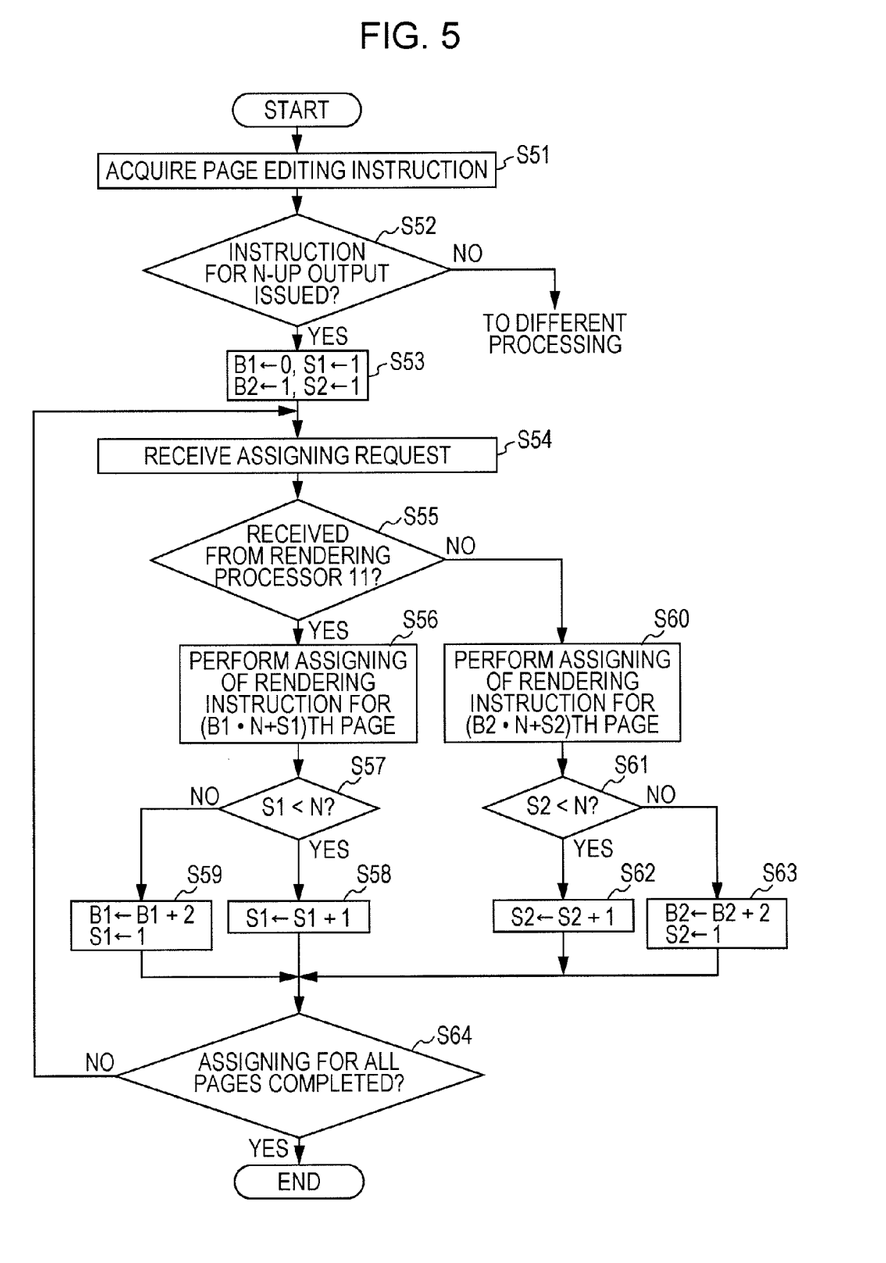
FIG. 5 is a flowchart illustrating an example of a rendering instruction assigning process performed in the case where an instruction for N-up output has been issued as a page editing instruction.

FIG. 5 is a flowchart illustrating an example of a rendering instruction assigning process performed in the case where an instruction for N-up output has been issued as a page editing instruction. In step S51, a page editing instruction is acquired. In step S52, it is determined whether or not the page editing instruction acquired in step S51 is an instruction for N-up output. When no page editing instruction is acquired or the acquired page editing instruction is not an instruction for N-up output, existing assigning processing or assigning processing corresponding to the acquired page editing instruction that is different from an instruction for N-up output is performed.

When the acquired page editing instruction is an instruction for N-up output, variables are initialized in step S53. In this example, the rendering processor 11 and the rendering processor 12 are used. The value of a counter B1, which counts in units of N pages to be processed by the rendering processor 11, is set to "0", and the value of a counter S1, which counts within the N pages, is set to "1". In addition, the value of a counter B2, which counts in units of N pages to be processed by the rendering processor 12, is set to "1", and the value of a counter S1, which counts within the N pages, is set to "1".

In step S54, a rendering instruction assigning request is received from the rendering processor 11 or the rendering processor 12. In step S55, it is determined whether or not the rendering instruction assigning request has been received from the rendering processor 11. When the assigning request has been received from the rendering processor 11, a rendering instruction for the (B1·N+S1)th page is assigned to the rendering processor 11 in step S56. In step S57, it is determined whether or not the value of the counter S1 is smaller than N. When the value of the counter S1 is smaller than N, the value of the counter S1 is incremented by 1 in step S58. Then, the process proceeds to step S64. When the value of the counter S1 is equal to or greater than N, the value of the counter B1 is incremented by 2 and the value of the counter S1 is initialized to "1" in step S59. Then, the process proceeds to step S64.

When it is determined in step S55 that the assigning request has been received from the rendering processor 12, a rendering instruction for the (B2·N+S2)th page is assigned to the rendering processor 12 in step S60. In step S61, it is determined whether or not the value of the counter S2 is smaller than N. When the value of the counter S2 is smaller than N, the value of the counter S2 is incremented by 1 in step S62. Then, the process proceeds to step S64. When the value of the counter S2 is equal to or greater than N, the value of the counter B2 is incremented by 2 and the value of the counter S2 is initialized to "1" in step S63. Then, the process proceeds to step S64.

In step S64, it is determined whether or not assigning of all the given rendering instructions is completed. When assigning of all the given rendering instructions is not completed, the process returns to step S54 to wait for an assigning request from the rendering processor 11 or the rendering processor 12. When assigning of all the given rendering instructions is completed, assigning processing for the given rendering instructions is terminated.

By performing the assigning process described above, rendering instructions for N pages to be output to one sheet are consecutively assigned to the rendering processor 11 or the rendering processor 12. For example, the same document format is used for the first, second, third, and fourth pages illustrated in FIG. 4A. By consecutively performing rendering processing for these pages by the rendering processor 11, rendering processing using the temporary memory 13 is performed, as described above. In addition, the same document format is used for the fifth, sixth, seventh, and eighth pages. By consecutively performing rendering processing for these pages by the rendering processor 12, rendering processing using the temporary memory 14 is performed, as described above.

Figure 6A:
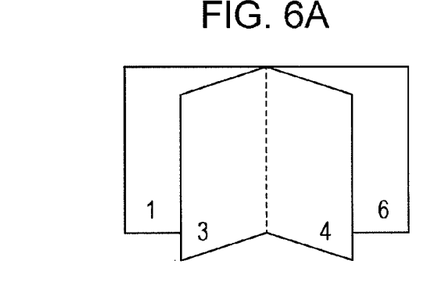
FIGS. 6A and 6B explain an example of assigning of rendering instructions in the case where an instruction for booklet output has been issued as a page editing instruction.
Figure 6B:
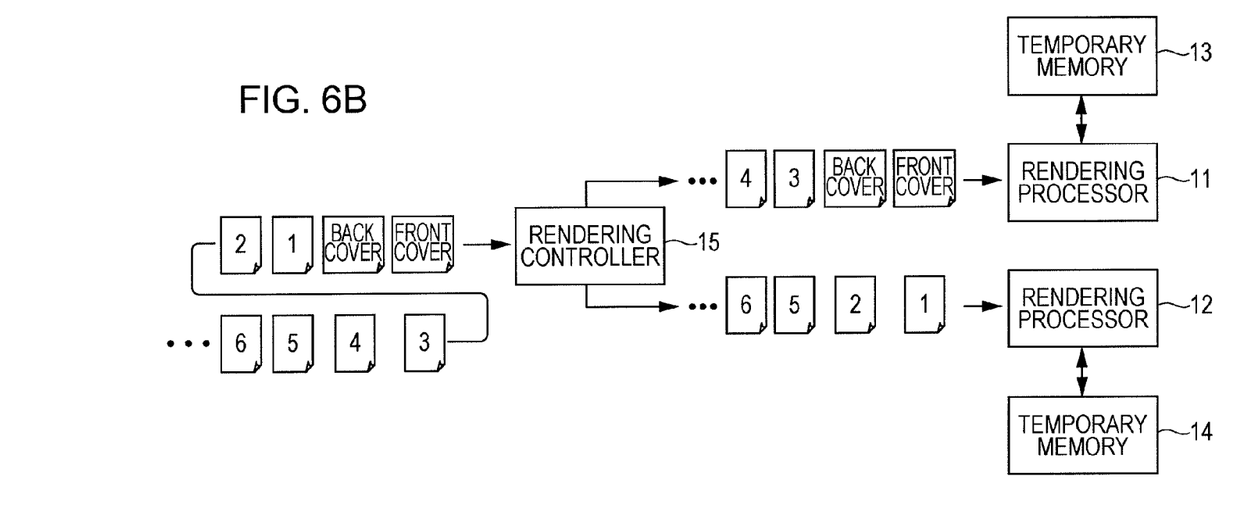

FIGS. 6A and 6B illustrate an example of assigning of rendering instructions in the case where an instruction for booklet output has been issued as a page editing instruction. FIG. 6A illustrates an example of an output material obtained when booklet output is performed. In the case where an instruction for booklet output has been issued as a page editing instruction, an output material is folded at the center thereof and is referred to. In this case, the same document format may be used for two pages facing each other, and rendering instructions for two pages that are to face each other are assigned as a unit to a corresponding rendering processor. For example, in the example illustrated in FIG. 6A, the first page and the second page are to face each other, the third page and the fourth page are to face each other, and the fifth page and the sixth page are to face each other. Thus, rendering instructions for these two pages that are to face each other may be assigned as a unit to a corresponding rendering processor. FIG. 6B illustrates an example of pages for which rendering instructions are assigned to the rendering processor 11 and the rendering processor 12. In this example, rendering instructions for the front and back covers and the third and fourth pages are assigned to the rendering processor 11, and rendering instructions for the first and second pages and the fifth and sixth pages are assigned to the rendering processor 12. The front cover and the back cover may be assigned as a unit to a corresponding rendering processor.

Figure 7:
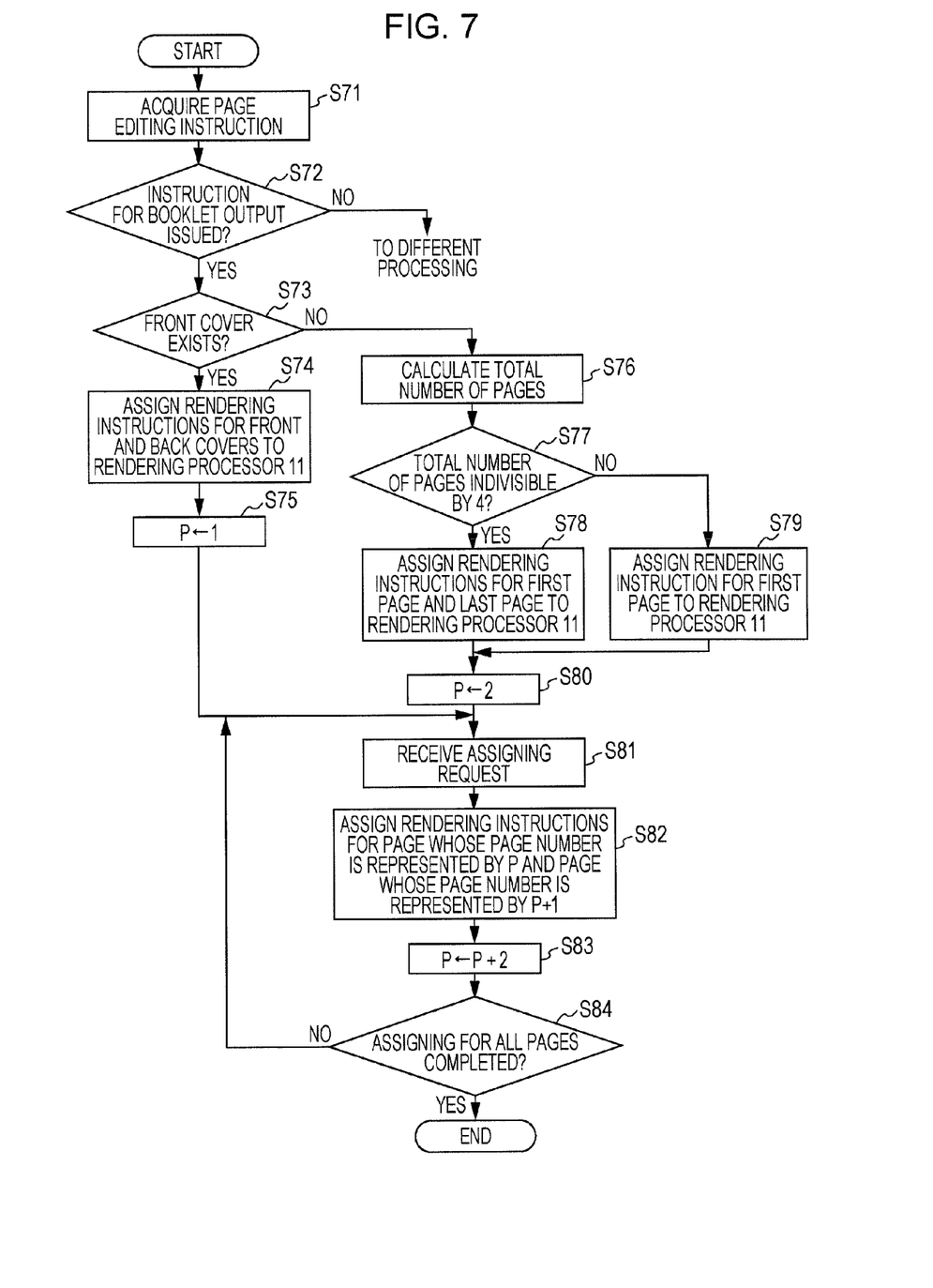
FIG. 7 is a flowchart illustrating an example of a rendering instruction assigning process performed in the case where an instruction for booklet output has been issued as a page editing instruction.

FIG. 7 is a flowchart illustrating an example of a rendering instruction assigning process performed in the case where an instruction for booklet output has been issued as a page editing instruction. In step S71, a page editing instruction is acquired. In step S72, it is determined whether or not the page editing instruction acquired in step S71 is an instruction for booklet output. When no page editing instruction is acquired or the acquired page editing instruction is not an instruction for booklet output, existing assigning processing or assigning processing corresponding to the acquired page editing instruction that is different from an instruction for booklet output is performed.

When the acquired page editing instruction is an instruction for booklet output, it is determined whether or not the front cover exists in step S73. When the front cover exists, rendering instructions for the front cover and the back cover are assigned to a corresponding rendering processor in step S74. In this example, the rendering instructions for the front cover and the back cover are assigned to the rendering processor 11. In step S75, a variable P, which represents the page number of the page to be processed, is initialized to "1". Then, the process proceeds to step S81.

When it is determined in step S73 that the front cover does not exist, a rendering instruction for the page that is to face the first page is assigned to a corresponding rendering processor. However, when the total number of pages is indivisible by 4, the page that is to face the first page does not exist. Thus, only a rendering instruction for the first page is assigned to a corresponding rendering processor. In step S76, the total number of pages is calculated. In step S77, it is determined whether or not the total number of pages is divisible by 4. When the total number of pages is divisible by 4, rendering instructions for the first page and the last page are assigned to a corresponding rendering processor in step S78. In this example, the rendering instructions for the first page and the last page are assigned to the rendering processor 11. When the total number of pages is indivisible by 4, only a rendering instruction for the first page is assigned to a corresponding rendering processor in step S79. In this example, only a rendering instruction for the first page is assigned to the rendering processor 11. After the processing of step S78 or step S79, a variable P2, which represents the page number of the page to be processed, is initialized to "2". Then, the process proceeds to step S81.

In step S81, a rendering instruction assigning request is received from the rendering processor 11 or the rendering processor 12. In step S82, rendering instructions for the page whose page number is represented by the variable P and the next page, which is the page whose page number is obtained by adding "1" to the variable P, are assigned to the rendering processor from which the assigning request has been received. For assigning of rendering instructions for two pages in step S82, in the case where the next page does not exist, assigning of a rendering instruction for only one page whose page number is represented by the variable P is performed. In step S83, "2" is added to the variable P.

In step S84, it is determined whether or not assigning of all the given rendering instructions is completed. When assigning of all the given rendering instructions is not completed, the process returns to step S81 to wait for an assigning request from the rendering processor 11 or the rendering processor 12. When assigning of all the given rendering instructions is completed, assigning processing for the given rendering instructions is terminated.

Assigning of rendering instructions to a corresponding rendering processor may be performed as described above in the case where an instruction for booklet output has been issued as a page editing instruction. Since rendering instructions for two pages that are to face each other, for which it is assumed that the same document format is to be used, are assigned as a unit to a corresponding rendering processor, registration to the temporary memory 13 or the temporary memory 14 is performed. For rendering processing for different pages for which this document format is used, the temporary memory 13 or the temporary memory 14 is used.

The case where an instruction for double-sided output has been issued as a page editing instruction, the case where an instruction for N-up output has been issued as a page editing instruction, and the case where an instruction for booklet output has been issued as a page editing instruction have been described above. In addition to these cases, rendering instructions for pages may be assigned to corresponding rendering processors in accordance with the characteristics of individual page editing instructions.

Figure 8:
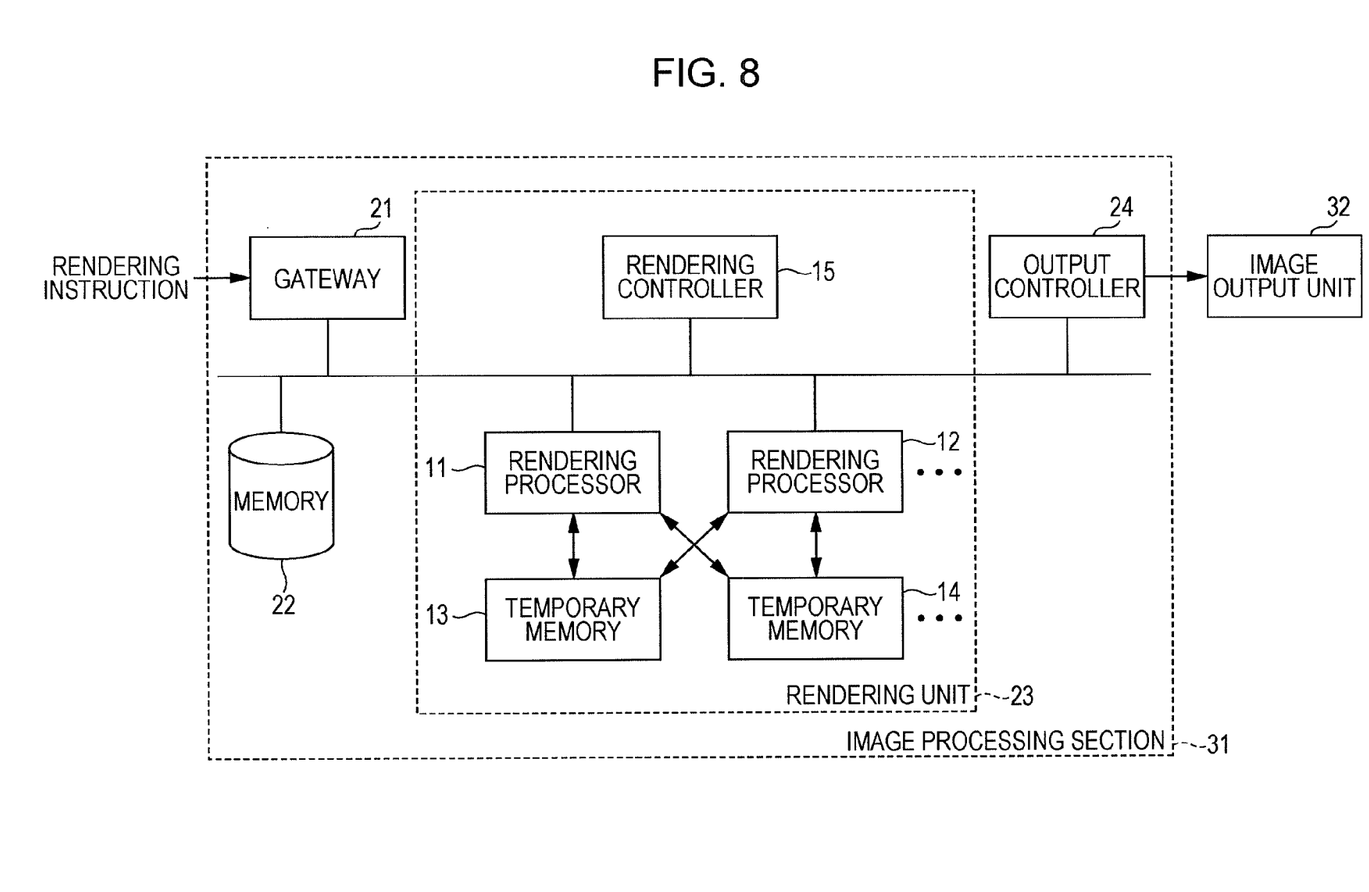
FIG. 8 is a diagram illustrating an example of the configuration of an image output apparatus according to an exemplary embodiment of the invention.
Figure 9:
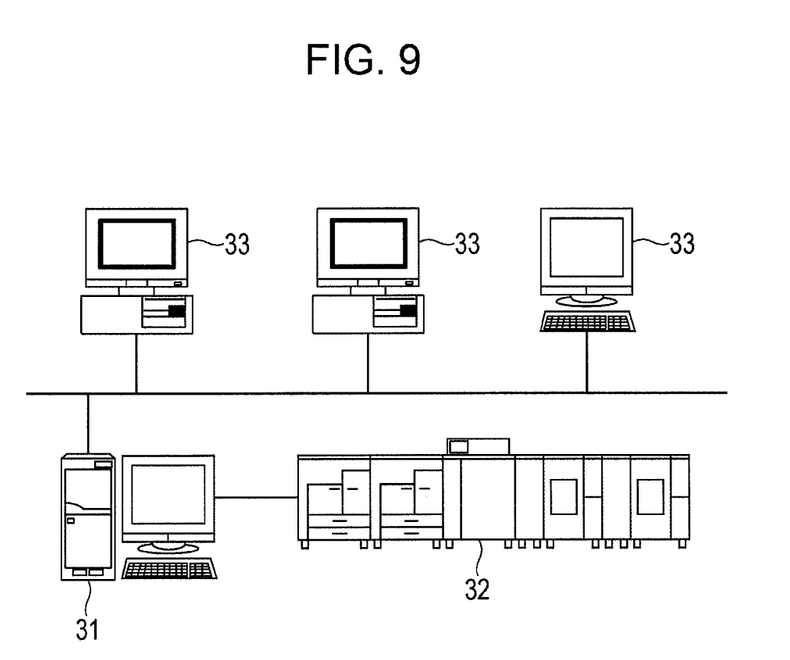
FIG. 9 is a diagram illustrating an example of the configuration of a system including the image output apparatus according to the exemplary embodiment of the invention.

FIG. 8 is a diagram illustrating the configuration of an image output apparatus according to an exemplary embodiment of the invention. FIG. 9 is a diagram illustrating an example of the configuration of a system including the image output apparatus according to the exemplary embodiment of the invention. Referring to FIGS. 8 and 9, the system includes a gateway 21, a memory 22, a rendering unit 23, an output controller 24, an image processing section 31, an image output unit 32, and terminals 33. In the system illustrated in FIG. 9, the image processing section 31 receives rendering instructions transmitted from the terminals 33. The image processing section 31 generates an image and transmits the generated image to the image output unit 32. The image output unit 32 outputs the image. The image processing section 31 and the image output unit 32 are not necessarily separately provided. The image processing section 31 and the image output unit 32 may be integrated with each other.

An example of the configuration of the image processing section 31 is illustrated in FIG. 8. The gateway 21 is an interface that receives rendering instructions transmitted from output devices, such as the terminals 33.

The memory 22 stores rendering instructions received at the gateway 21 and images rendered by the rendering unit 23. The temporary memories 13 and 14 of the rendering unit 23 may be arranged as the memory 22.

The rendering unit 23 has the configuration of the above-explained rendering device according to the exemplary embodiment of the invention. The rendering unit 23 reads a rendering instruction stored in the memory 22, renders an image in accordance with the rendering instruction, and stores the rendered image into the memory 22.

The output controller 24 reads an image rendered by the rendering unit 23 and stored in the memory 22, and controls the image output unit 32 to output an image in accordance with a page editing instruction. The output controller 24 also has a capability as an editing unit that edits rendered images in units of pages in accordance with a page editing instruction. For example, in the case where an instruction for double-sided output has been issued as a page editing instruction, the output controller 24 controls the image output unit 32 to form images on both sides of a medium. For example, in the case where an instruction for N-up output has been issued as a page editing instruction, images for N pages are reduced and combined into an image, and causes the image output unit 32 to output the combined image. For example, in the case where an instruction for booklet output has been issued as a page editing instruction, the output controller 24 controls the image output unit 32 to perform reduction and combining of pages so as to form a booklet by folding at the center and to form the combined image of both sides of a medium. Obviously, the output controller 24 may control the image output unit 32 to combine the above-mentioned various types of processing or to perform editing in accordance with a different page editing instruction and output the edited image.

The functions of the rendering processors 11 and 12 and the rendering controller 15 of the rendering device according to the exemplary embodiment of the invention described above or the function of the output controller 24 of the image output apparatus according to the exemplary embodiment of the invention described above may be entirely or partially implemented by a program executed by a computer. In this case, the program, data to be used by the program, and the like may be stored in a computer readable storage medium. The storage medium induces the state in which magnetic energy, light energy, electric energy, or the like of a reading unit, which is provided in a hardware resource of the computer and is not illustrated, changes in accordance with programming instructions, and transmits the programming instructions to the reading unit in a corresponding signal form. For example, the storage medium may be a magneto-optical disk, an optical disk (including a compact disc (CD) and a digital versatile disk (DVD)), a magnetic disk, a memory (including an IC card, a memory card, and a flash memory), or the like. Obviously, the storage medium is not necessarily portable.

The functions of the rendering processors 11 and 12 and the rendering controller 15 of the rendering device according to the exemplary embodiment of the invention described above or the function of the output controller 24 of the image output apparatus according to the exemplary embodiment of the invention described above are entirely or partially implemented by storing a program on the storage medium, installing the storage medium into, for example, the reading unit, which is not illustrated, or an interface, which is not illustrated, of the computer, reading the program from the computer, storing the program into an internal memory or the memory 22 (including a magnetic disk and a silicon disk) in the case of the configuration illustrated in FIG. 8, and executing the program by a central processing unit (CPU). Alternatively, the functions of the rendering processors 11 and 12 and the rendering controller 15 of the rendering device according to the exemplary embodiment of the invention described above or the function of the output controller 24 of the image output apparatus according to the exemplary embodiment of the invention described above may be entirely or partially implemented by transferring the program to the computer via a communication path, receiving the program, for example, by the gateway 21 in the computer in the case of the configuration illustrated in FIG. 8, storing the program into the internal memory or the memory 22, and executing the program by the CPU.

Obviously, the rendering processors 11 and 12, the rendering controller 15, and the output controller 24 may be partially or entirely configured by hardware. Alternatively, a program of a different function may be included or part of a program of a different function may be incorporated. Furthermore, a configuration including various devices that are not illustrated may be provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A rendering device comprising:
a memory;
a plurality of rendering processors that perform pre-printing rendering processing on pages of document data in accordance with pre-printing rendering instructions for the pages, and obtain rendered pre-printing pages based on results of the pre-printing rendering processing, wherein each of the plurality of rendering processors stores the pre-printing rendering instructions and rendered pre-printing pages in association with each other in the memory, and reads rendered results associated with pre-printing rendering instructions from the memory and uses the rendered results for a subsequent page without performing pre-printing rendering processing on the subsequent page in accordance with the pre-printing rendering instructions to obtain the rendered results for the subsequent pages when the rendered results associated with the pre-printing rendering instructions for rendering are stored in the memory; and
a rendering controller that assigns a pre-printing rendering instruction for a page to one of the plurality of rendering processors in accordance with a given page print setting instruction and controls the assigned one of the rendering processors to perform the pre-printing rendering processing,
wherein when the page print setting instruction is a double-sided output instruction, the rendering controller assigns a pre-printing rendering instruction for an odd numbered page to a corresponding one of the plurality of rendering processors and assigns a pre-printing rendering instruction for an even number page to a different one of the plurality of rendering processors.

2. An image output apparatus comprising:
an editing unit that receives a rendered result by the rendering device according to claim 1 and that performs editing processing in units of pages in accordance with the given page print setting instruction; and
an output unit that outputs an image edited by the editing unit.

3. A rendering device comprising:
a memory;
a plurality of rendering processors that perform pre-printing rendering processing on pages of document data in accordance with pre-printing rendering instructions for the pages, and obtain rendered pre-printing pages based on results of the pre-printing rendering processing, wherein each of the plurality of rendering processors stores the pre-printing rendering instructions and rendered pre-printing pages in association with each other in the memory, and reads rendered results associated with pre-printing rendering instructions from the memory and uses the rendered results for a subsequent page without performing pre-printing rendering processing on the subsequent page in accordance with the pre-printing rendering instructions to obtain the rendered results for the subsequent pages when the rendered results associated with the pre-printing rendering instructions for rendering are stored in the memory; and
a rendering controller that assigns a pre-printing rendering instruction for a page to one of the plurality of rendering processors in accordance with a given page print setting instruction and controls the assigned one of the rendering processors to perform the pre-printing rendering processing,
wherein when the page print setting instruction is a N-up output instruction, the rendering controller assigns pre-printing rendering instructions for N pages to a different one of the plurality of rendering processors every N pages, and wherein N is an integer greater than or equal to 2.

4. An image output apparatus comprising:
an editing unit that receives a rendered result by the rendering device according to claim 3 and that performs editing processing in units of pages in accordance with the given page print setting instruction; and
an output unit that outputs an image edited by the editing unit.

5. A rendering device comprising:
a memory;
a plurality of rendering processors that perform pre-printing rendering processing on pages of document data in accordance with pre-printing rendering instructions for the pages, and obtain rendered pre-printing pages based on results of the pre-printing rendering processing, wherein each of the plurality of rendering processors stores the pre-printing rendering instructions and rendered pre-printing pages in association with each other in the memory, and reads rendered results associated with pre-printing rendering instructions from the memory and uses the rendered results for a subsequent page without performing pre-printing rendering processing on the subsequent page in accordance with the pre-printing rendering instructions to obtain the rendered results for the subsequent pages when the rendered results associated with the pre-printing rendering instructions for rendering are stored in the memory; and
a rendering controller that assigns a pre-printing rendering instruction for a page to one of the plurality of rendering processors in accordance with a given page print setting instruction and controls the assigned one of the rendering processors to perform the pre-printing rendering processing,
wherein in a case where an instruction for booklet output has been issued as the page editing instruction, the rendering controller assigns the pre-printing rendering instructions to different ones of the plurality of rendering processors in units of two pages that face each other.

6. An image output apparatus comprising:
an editing unit that receives a rendered result by the rendering device according to claim 5 and that performs editing processing in units of pages in accordance with the given page print setting instruction; and
an output unit that outputs an image edited by the editing unit.

7. A non-transitory computer readable medium storing a program causing a computer to execute a process for rendering, the process comprising:
controlling a plurality of rendering processors to perform pre-printing rendering processing on pages of document data in accordance with pre-printing rendering instructions for the pages, obtain rendered pre-printing pages based on results of the pre-printing rendering processing, store the pre-printing rendering instructions and rendered pre-printing pages in association with each other in a memory, and read the rendered results associated with the pre-printing rendering instructions when the rendered results associated with the pre-printing rendering instructions for rendering are stored in the memory; and
controlling a rendering controller to assign a pre-printing rendering instruction for a page to one of the plurality of rendering processors in accordance with a given page print setting instruction and the assigned one of the rendering processors to perform the pre-printing rendering processing,
wherein in a case where an instruction for double-sided output has been issued as the given page print setting instruction, the controlling the rendering controller further comprises controlling the rendering controller to assign a pre-printing rendering instruction for an odd numbered page to a corresponding one of the plurality of rendering processors and assign a pre-printing rendering instruction for an even number page to a different one of the plurality of rendering processors.

8. A non-transitory computer readable medium storing a program causing a computer to execute a process for rendering, the process comprising:
controlling a plurality of rendering processors to perform pre-printing rendering processing on pages of document data in accordance with pre-printing rendering instructions for the pages, obtain rendered pre-printing pages based on results of the pre-printing rendering processing, store the pre-printing rendering instructions and rendered pre-printing pages in association with each other in a memory, and read the rendered results associated with the pre-printing rendering instructions when the rendered results associated with the pre-printing rendering instructions for rendering are stored in the memory; and
controlling a rendering controller to assign a pre-printing rendering instruction for a page to one of the plurality of rendering processors in accordance with a given page print setting instruction and the assigned one of the rendering processors to perform the pre-printing rendering processing,
wherein in a case where an instruction for N-up output has been issued as the given page print setting instruction, the controlling the rendering controller further comprises controlling the rendering controller to assign pre-printing rendering instructions for N pages to a different one of the plurality of rendering processors every N pages,
wherein N is an integer greater than or equal to 2.

9. A non-transitory computer readable medium storing a program causing a computer to execute a process for rendering, the process comprising:
controlling a plurality of rendering processors to perform pre-printing rendering processing on pages of document data in accordance with pre-printing rendering instructions for the pages, obtain rendered pre-printing pages based on results of the pre-printing rendering processing, store the pre-printing rendering instructions and rendered pre-printing pages in association with each other in a memory, and read the rendered results associated with the pre-printing rendering instructions when the rendered results associated with the pre-printing rendering instructions for rendering are stored in the memory; and
controlling a rendering controller to assign a pre-printing rendering instruction for a page to one of the plurality of rendering processors in accordance with a given page print setting instruction and the assigned one of the rendering processors to perform the pre-printing rendering processing,
wherein in a case where an instruction for booklet output has been issued as the given page print setting instruction, the controlling the rendering controller further comprises controlling the rendering controller to assign assigns the pre-printing rendering instructions to different ones of the plurality of rendering processors in units of two pages that face each other.

* * * * *